(12) United States Patent
Izumi et al.

(10) Patent No.: US 6,848,531 B2
(45) Date of Patent: Feb. 1, 2005

(54) DRIVE SYSTEM FOR SMALL VEHICLE

(75) Inventors: Kazuhiko Izumi, Shizuoka (JP); Hitoshi Takeuchi, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 151 days.

(21) Appl. No.: 10/119,423

(22) Filed: Apr. 9, 2002

(65) Prior Publication Data
US 2002/0170768 A1 Nov. 21, 2002

(30) Foreign Application Priority Data

Apr. 9, 2001 (JP) ........................................ 2001-109380

(51) Int. Cl.$^7$ .......................... B60K 17/04; B60K 17/24
(52) U.S. Cl. ....................... 180/344; 180/370; 180/384; 74/400; 74/411.5; 74/417; 74/424
(58) Field of Search ................................ 180/344, 348, 180/359, 370, 376, 383, 384, 215; 74/400, 411.5, 424, 417

(56) References Cited

U.S. PATENT DOCUMENTS

| | | | | |
|---|---|---|---|---|
| 1,434,578 A | * | 11/1922 | Alden | 74/400 |
| 1,828,929 A | * | 10/1931 | Ghiselli | 74/400 |
| 3,375,727 A | * | 4/1968 | Nasvytis et al. | 74/400 |
| 3,572,154 A | * | 3/1971 | Bartolomucci | 74/400 |
| 4,662,471 A | | 5/1987 | Kondo et al. | |
| 4,664,215 A | | 5/1987 | Suzuki et al. | |
| 4,667,760 A | | 5/1987 | Takimoto | |
| 4,719,984 A | * | 1/1988 | Watanabe | 180/370 |
| 4,811,810 A | | 3/1989 | Watanabe | |
| 4,953,656 A | | 9/1990 | Kondo et al. | |
| 5,267,489 A | * | 12/1993 | Ziech | 74/606 R |
| 6,364,803 B1 | * | 4/2002 | Barnholt et al. | 74/396 |

FOREIGN PATENT DOCUMENTS

JP 60-249745 12/1985

* cited by examiner

Primary Examiner—Peter C. English
(74) Attorney, Agent, or Firm—Knobbe Martens Olson & Bear LLP

(57) ABSTRACT

A small vehicle features a drive system that directs power from an engine unit to at least one driven wheel. The driven wheel is connected to a half shaft. The half shaft is driven by a ring gear. The ring gear is driven by a pinion gear. The pinion gear is connected to a longitudinally extending drive shaft. The pinion gear is axially adjustable along the rotational axis of the drive shaft relative to the ring gear. The pinion gear is not substantially axially adjustable relative to a cover member the partially defines a gear housing. The cover member is adjustably secured to the balance of the gear housing through a shim. The shim can be exchanged for varied shim sizes to effect proper meshing between the pinion gear and the ring gear.

11 Claims, 5 Drawing Sheets

DRIVE SYSTEM FOR SMALL VEHICLE

RELATED APPLICATIONS

This application is related to Japanese Patent Application No. 2001-109,380, filed Apr. 9, 2001.

BACKGROUND OF THE INVENTION

1. Field of the Invention

The present invention generally relates to drive systems for small vehicles. More particularly, the present invention relates to such a drive system featuring a construction that facilitates backlash adjustment between a pinion gear and a ring gear.

2. Description of the Related Art

All terrain vehicles are but one example of smaller vehicles that are powered by internal combustion engines. These smaller vehicles typically transfer the power from the engine to a set of wheels or other similar members. In some arrangements, a longitudinally-extending drive shaft carries the power from the engine to a pair of rear wheels through a pinion gear and a ring gear. As the drive shaft rotates the pinion gear, the pinion gear rotates the ring gear and any axles that are connected to the ring gear. The end of the drive shaft carrying the pinion gear typically is fixed to a gear case that contains the ring gear.

These smaller vehicles also generally comprise a simplified braking system. In one arrangement, such as that shown in U.S. Pat. No. 4,667,760, issued to Takimoto on May 26, 1987, the braking system generally comprises a brake disc that is mounted to the drive shaft and a brake caliper that is mounted to the gear case. To slow or stop the vehicle, the brake caliper is actuated to clamp a set of brake pads to the brake disc. By slowing or stopping the rotation of the drive shaft, the vehicle itself can be slowed or stopped.

SUMMARY OF THE INVENTION

While these constructions have proven generally satisfactory for quite some time, improvements to the manufacturability of the vehicles and the drive lines have been desired. One such improvement relates to achieving the proper degree of meshing between the pinion gear and the ring gear. As discussed above, both the pinion gear and the brake system are rigidly fixed to the gear housing that contains the ring gear. It has been found that proper meshing is best achieved when the placement of the pinion gear relative to the ring gear can be slightly adjusted. The rigid connections between the pinion gear and the housing and the between the brake system and the housing thwart such adjustments.

Accordingly, one aspect of the present invention involves a drive system for a small vehicle. The system comprises an engine crankshaft with a drive shaft driven by the crankshaft. The drive shaft extends in a generally longitudinal direction. A gear housing is disposed proximate a distal end of the drive shaft. The gear housing comprises an opening that is substantially closed by a first cover. The drive shaft is coupled to a drive sleeve with the drive sleeve extending through an aperture defined in the first cover. A stub shaft is rotationally secured to the drive sleeve and couples a pinion gear to the drive sleeve. The pinion gear is disposed within the gear housing and meshes with a ring gear. The pinion gear is axially fixed relative to the first cover and is axially adjustable relative to the ring gear.

Another aspect of the present invention involves a drive system for a small vehicle. The drive system comprises a longitudinally extending drive shaft with a pinion gear driven by the drive shaft. The pinion gear meshes with a ring gear. The pinion gear and the ring gear are disposed within a chamber defined by a gear housing. The gear housing comprises a first cover with the pinion being connected to the first cover and the pinion and first cover being axially adjustable relative to the ring gear.

A further aspect of the present invention involves a drive system for a small vehicle that comprises a longitudinally extending drive shaft, a gear housing, a pinion gear driven by the drive shaft and disposed within the gear housing, a ring gear meshing with the pinion gear and disposed within the gear housing, at least one axle coupled to the ring gear and extending from the gear housing, and means for adjusting an axial position of the pinion gear relative to the ring gear.

BRIEF DESCRIPTION OF THE DRAWINGS

These and other features, aspects and advantages of the present invention will now be described with reference to the drawings of a preferred embodiment, which preferred embodiment is intended to illustrate and not to limit the invention. The drawings comprise five figures.

DETAILED DESCRIPTION OF THE PREFERRED EMBODIMENT

With initial reference to FIGS. 1 and 2, a vehicle 10 that comprises a drive system arranged and configured in accordance with certain features, aspects and advantages of the present invention will be described. The illustrated vehicle 10 is a four-wheeled utilitarian or recreational vehicle. More particularly, the illustrated vehicle 10 is a four-wheeled all terrain vehicle. In some applications, the vehicle 10 can have other numbers of wheels. For instance, the vehicle can have as few as one wheel or more than four wheels, depending upon the desired application. In addition, certain features, aspects and advantages of the present invention can be used with tracked vehicles, such as snowmobiles, for instance. Accordingly, the illustrated vehicle 10 simply provides one environment in which certain features, aspects and advantages of the present invention can be used.

Figure 3:
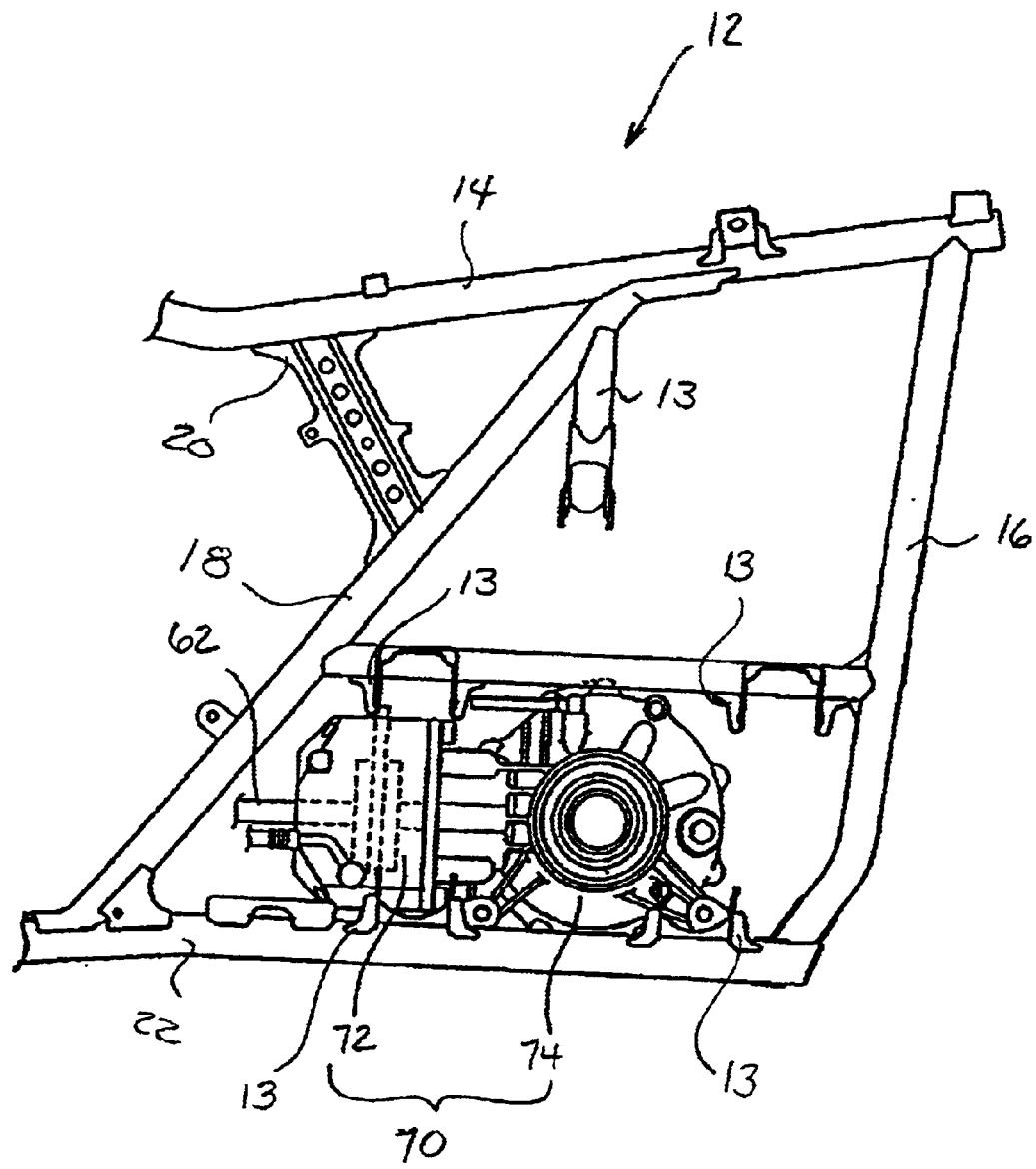
FIG. 3 is an enlarged side elevation view of a portion of the vehicle and drive system of FIG. 1.
Figure 4:
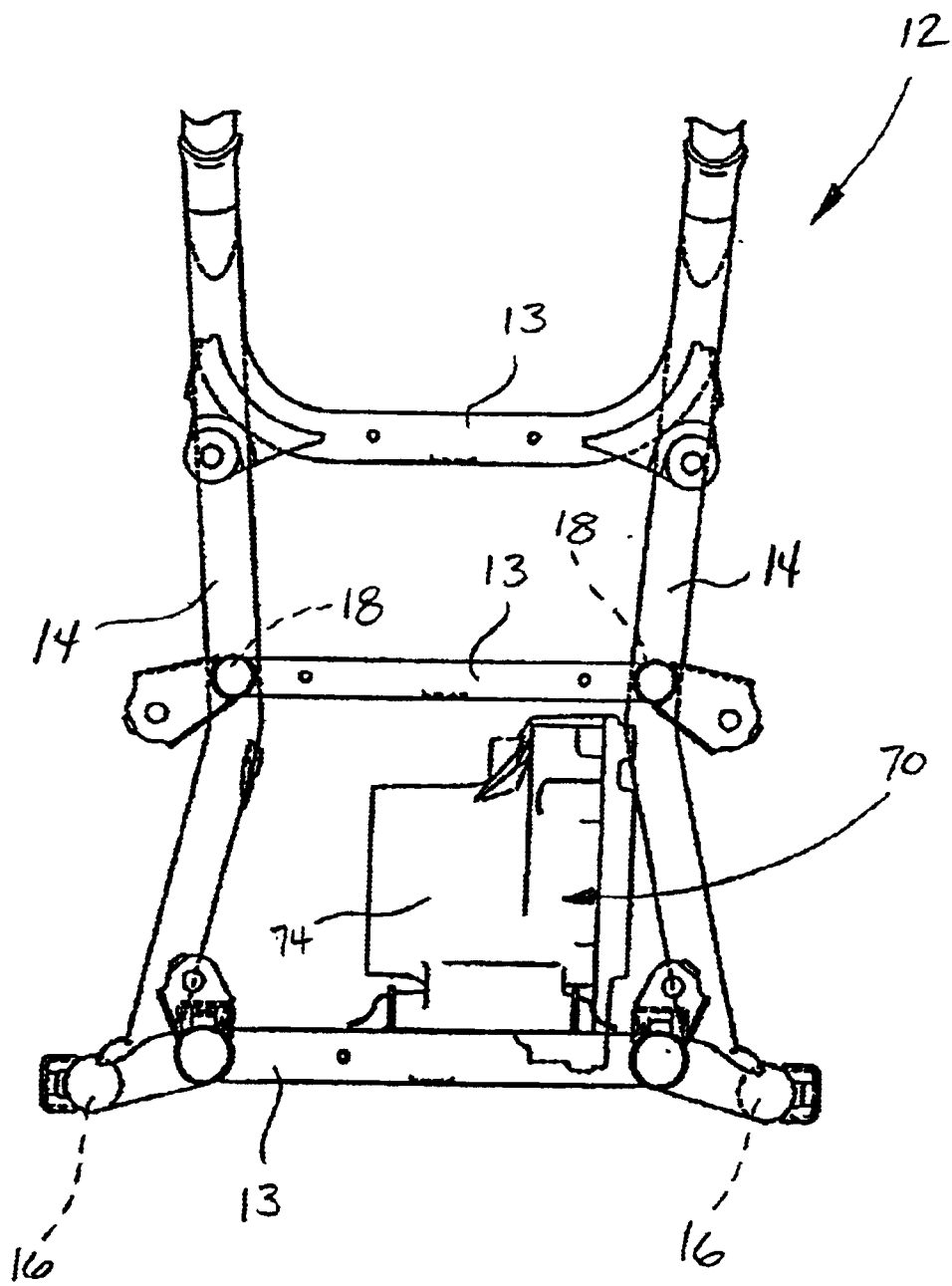
FIG. 4 is an enlarged top plan view of the portion of the vehicle and drive system shown in FIG. 3.

The illustrated vehicle 10 generally comprises a welded-up frame assembly 12 (see FIGS. 3 and 4). Any suitable frame assembly 12 can be used. The illustrated frame assembly 12 generally comprises a pair of substantially parallel subassemblies that are laterally spaced from each other and secured together with a number of cross members 13.

The subassemblies each generally comprise a main tube 14 that extends rearward from a head tube (not shown). The main tubes 14 in the illustrated arrangement extend rearward and are supported by pillar tubes 16 proximate a rear portion of the main tubes 14 and down tubes 18 at a location forward of the pillar tubes 16. Suitable bracing members 20 can be provided in strategic locations to reinforce the subassemblies. Bottom rails 22 extend a majority of the length of each subassembly and are connected to a lower portion of the respective pillar tubes 16 and down tubes 18.

The frame assembly 12 is supported by ground engaging elements, such as a group of wheels in the illustrated arrangement. The ground engaging elements also can comprise runners, skis, drive belts and the like, depending upon the application. The illustrated vehicle comprises a pair of front wheels 24 and a pair of rear wheels 26 that support the frame assembly 12 in a known manner. In general, the wheels 24, 26 are connected to the frame assembly 12 using any suitable suspension system.

A body assemblage is supported by the frame assembly 12. The body assemblage comprises a number of components that are generally known to those of ordinary skill in the art. These components are attached to the frame assembly 12 in any suitable manner, including those generally known to those of ordinary skill in the art.

The body assemblage comprises a front fender assembly 28 and a rear fender assembly 30. The fender assemblies 28, 30 generally comprise members that extend over the respective wheels 24, 26 and, in some arrangements, intermediate members that span the distance between the wheel covering members. These members can be integrated into a single component or can be formed of distinct components.

The body assemblage also comprises a front carrying rack 32 and a rear carrying rack 34. These racks 32, 34 are supported above a portion of the respective fender assemblies 28, 30 in any suitable manner. In some configurations, the racks 32, 34 are supported by the respective fender assemblies 28, 30.

Rearward of the front fender assembly 28, the body assemblage also comprises a gauge cluster 36. The gauge cluster 36 comprises a number of vehicle operating condition indicators, such as are known in the art. The gauge cluster 36 can be integrated into the front fender assembly 28 in some configurations.

Rearward of the illustrated gauge cluster, the body assemblage preferably comprises a fuel tank 38 and a seat 40. The fuel tank 38 can be an actual fuel tank or can be a hollowed shell component that is designed to resemble a fuel tank while providing a recess into which an air intake can extend. In such arrangements, the actual fuel tank 38 can be positioned below the seat 40.

Forward of the fuel tank 38 and rearward of the gauge cluster in the illustrated arrangement, the vehicle 10 comprises a handlebar assembly 42. The handlebar assembly 42 preferably comprises a pair of handgrips 44 that are mounted in a manner to allow an operator holding the grips 44 to pivot a steering column 46. The steering column 46 effects steering movement of the front wheels 24 through any suitable linkage.

In the illustrated arrangement, a pair of foot boards 48 are mounted to the frame assembly 12, with one foot board 48 being positioned on each lateral side of the frame assembly 12. In some arrangements, the foot boards 48 can be replaced by foot peg or nerf bars. Other suitable foot support arrangements also can be used.

Figure 1:
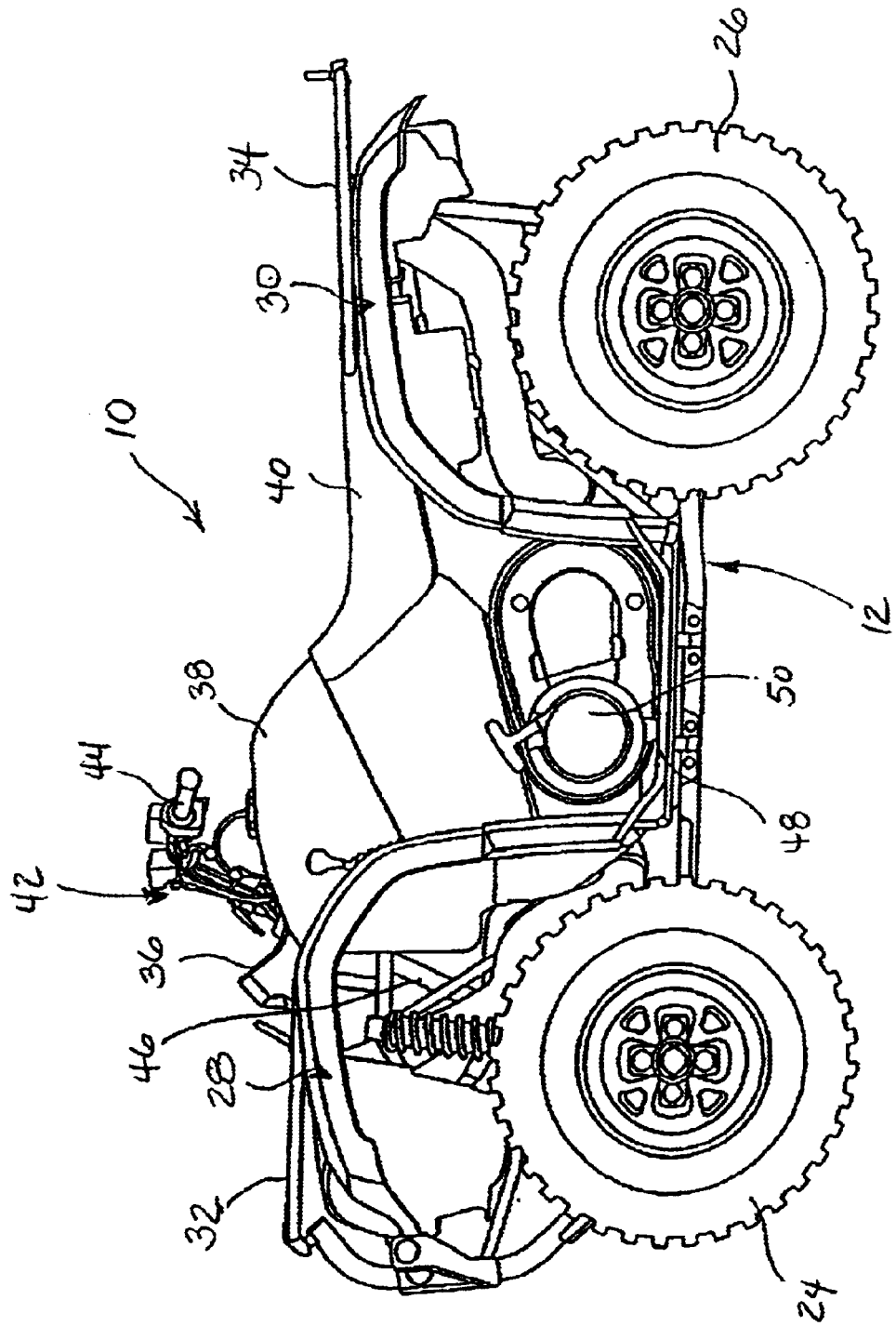
FIG. 1 is a side elevation view of a vehicle having a drive system arranged and configured in accordance with certain features, aspects and advantages of the present invention.
Figure 2:
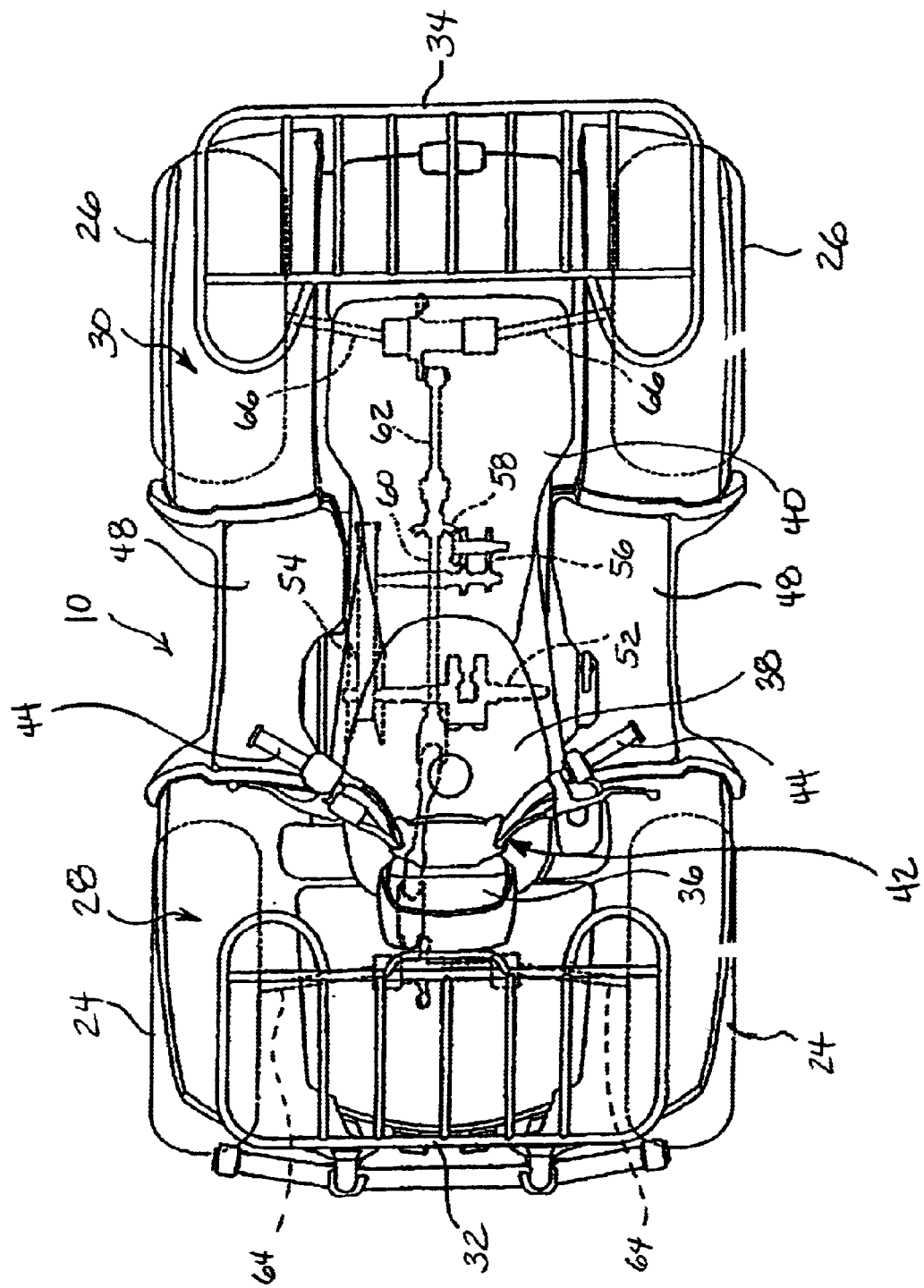
FIG. 2 is a top plan view of the vehicle of FIG. 1 showing a portion of the drive system with hidden lines.

With reference to FIG. 1, an engine unit 50 is mounted to the frame assembly 12 at a location generally below the fuel tank 38 and the seat 40. The engine unit 50 can be of any suitable construction. In a preferred arrangement, the engine unit 50 comprises an internal combustion engine and a transmission that are combined into a single member. The engine unit 50 can have any desired orientation. In the illustrated arrangement, as shown in the simplified view of FIG. 2, the engine unit 50 comprises a transversely extending crankshaft 52. The crankshaft 52 comprises a single throw, which is defined by a pin that extends between a pair of webs of the crankshaft 52. Thus, the illustrated engine unit 50 is a single cylinder construction; however, more than one cylinder can be used in other arrangements.

The crankshaft 52 preferably drives a suitable continuously variable transmission (CVT) 54. More preferably, the crankshaft drives a belt-type CVT 54, such as that shown in the illustrated arrangement. Other suitable CVT constructions also can be used. In addition, arrangements not using a CVT can be implemented.

The CVT 54 drives a change speed transmission 56 in the illustrated arrangement. The change speed transmission 56 preferably provides a low, high, neutral and reverse gearing. In some configurations, the change speed transmission also features a park lock position such that movement of the vehicle can be precluded by a construction positioned within the change speed transmission 56. As the operator operates the vehicle 10, the operator can shift gears among low, high, neutral and reverse depending upon the desired operating characteristics.

The illustrated change speed transmission 56 features an output shaft that drives a bevel gear 58 that can be disposed within a transfer case. (not shown). In some arrangements, the transfer case can be integrated into the engine unit 50, which also includes a gear box that contains the change speed transmission 56.

The bevel gear 58 is connected to a front drive shaft 60 and a rear drive shaft 62. Preferably, the front drive shaft 60 can be selectively coupled and decoupled from the drive train to switch operation between four wheel drive and two wheel drive. The front drive shaft 60 is connected to a pair of front half shafts 64 and the rear drive shaft is connected to a pair of rear half shafts 66. Preferably, the half shafts 64, 66 are connected to the respective drive shafts 60, 62 with suitable constant velocity joints (CV joints). The half shafts 64, 66 drive the respective wheels 24, 26.

With reference now to FIGS. 3 and 4, an integrated brake and rear gear housing 70 is illustrated therein. The housing 70 comprises a brake portion 72 and a gearing portion 74. The gearing portion 74 contains gears to transfer power from the rear drive shaft 62 to the two rear half shafts 66. In some arrangements, the brake portion 72 and the gearing portion 74 can be separately provided and spaced from each other; however, the illustrated arrangement provides a compact and simple construction that facilitates assembly and improves manufacturability in manners that will be described.

The housing 70 preferably is mounted rearward of the engine unit 50 and within the frame assembly 12. In the illustrated arrangement, the housing 70 is mounted below the rear fender assembly 34, generally rearward of the seat 40, and centrally between the two rear wheels 26. In the illustrated arrangement, the housing 70 also is mounted to a pair of cross members 13 in a suitable manner. Other suitable mounting arrangements also can be used.

Figure 5:
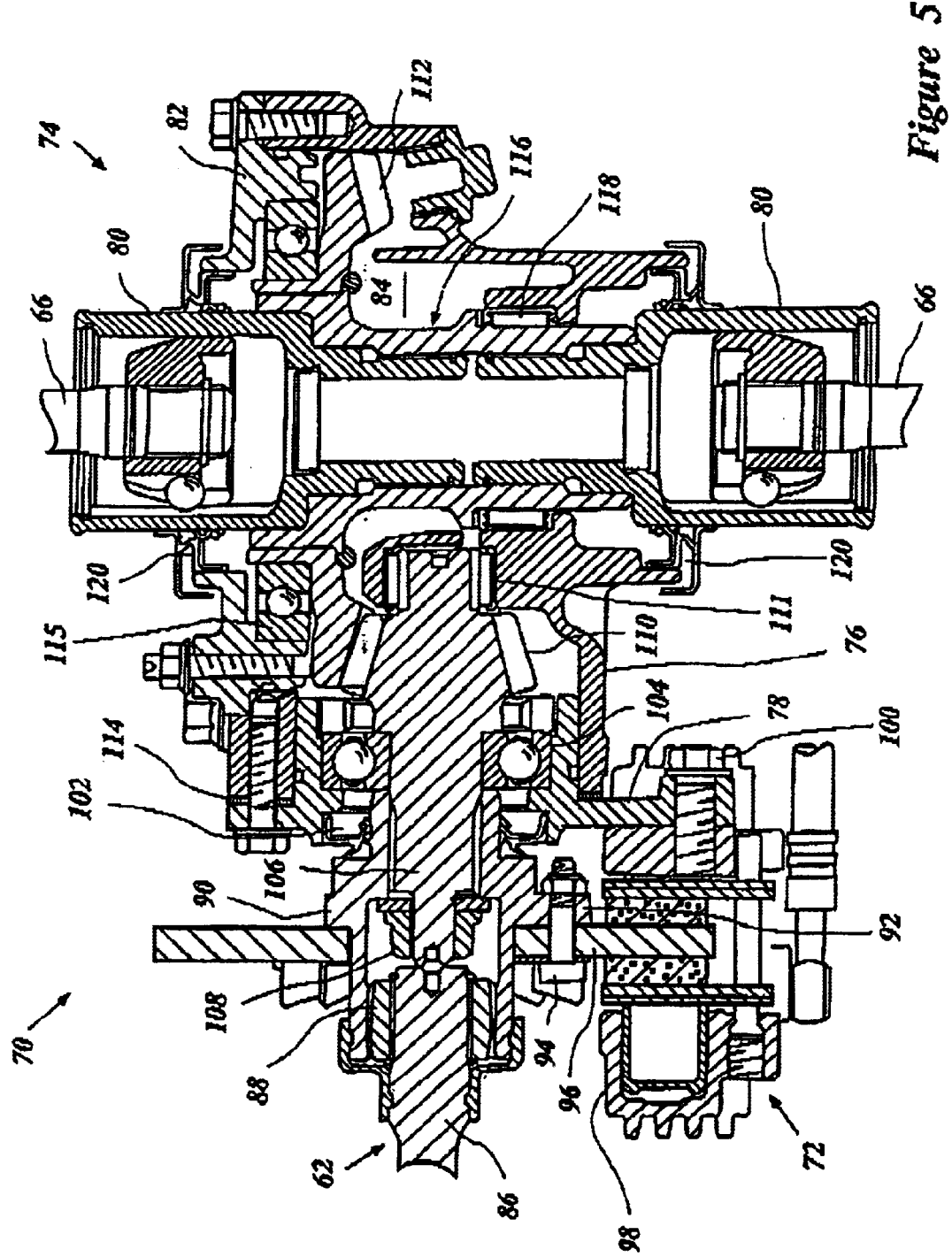
FIG. 5 is an enlarged cross-sectioned view the portion of the drive system shown in FIGS. 3 and 4.

With reference now to FIG. 5, the housing 70 and the components disposed within the housing 70 will be described. The housing 70 generally comprises a main case 76 that comprises three openings. When the housing 70 is installed on the vehicle 10, one of the three openings extends through a forward portion of the main case 76 while the other two openings extend through the two lateral portions of the main case 76. The forward-facing opening receives a first cover 78 that contains an opening sized and configured to accommodate the rear drive shaft 62. One of the lateral-facing openings is sized and configured to accommodate a first axle sleeve 80. The other of the lateral-facing openings receives a second cover 82 that contains an opening sized and configured to accommodate a second axle sleeve 80. Together, the main case 76 and the two covers 78, 82 define a chamber 84 in which the rear drive shaft 62 is coupled to the two rear half shafts 66.

In the illustrated arrangement, the actual rear drive shaft 62 terminates just forward of the chamber 84. The rear drive shaft 62 has a distal or rear portion 86 that comprises splines or other suitable keyways formed about its circumference. A collar 88 that features both an internally splined surface and an externally splined surface is fixed for rotation along the rear portion 86 of the rear drive shaft 62. The splines can be any suitable keyway or the like that allows two rotary members to be coupled for rotation. Preferably, the interlocking structure also allows relative axial movement between the members once the members are joined together. The illustrated collar 88 is secured in position along the distal portion of the rear drive shaft 62 with a pair of snap rings or the like.

A drive sleeve 90 extends over the collar 88 and the rear portion 86 of the rear drive shaft 62. The drive sleeve preferably contains a structure the interlocks with the outer surface of the collar. For instance, in the illustrated arrangement, the drive sleeve 90 comprises an internally splined surface that interlocks with external splines on the collar 88. In this manner, the drive sleeve 90 is connected to the drive shaft 62 through the intermediate collar 88. In one arrangement, the drive sleeve 90 can be directly connected to the drive shaft 62 without an intervening member; however, the collar 88 facilitates assembly of the illustrated components due to the relative diameters reflected by each of the illustrated components.

The drive sleeve 90 comprises a number of mounting lugs 92 (one shown) that extend radially outward from a cylindrical portion of the drive sleeve 90. The lugs 92 receive fasteners 94, such as bolts, threaded fasteners or the like. The fasteners attach a brake disc 96 to the drive sleeve 90. In addition, a brake caliper 98 is attached to the first cover 78 with a threaded fastener 100. Other methods of attaching the brake caliper 98 to the first cover 78 also can be used. The brake caliper 98 extends around a portion of the periphery of the brake disc and can be actuated to clamp onto the brake disc in any suitable manner. The illustrated arrangement features a cable construction; however, other suitable actuating arrangements, such as hydraulic actuation, can be used.

The drive sleeve 90 extends through the opening in the first cover 78. A seal 102 is provided between the drive sleeve 90 and the opening in the first cover 78. A bearing 104 is mounted within the first cover proximate the opening and proximate a distal end of the drive sleeve 90. The bearing 104, preferably a ball bearing, journals a stub shaft 106 that is secured to the drive sleeve 90. The stub shaft 106 preferably is connected to the drive sleeve in a manner that locks the two components together for rotation. In addition, as shown in FIG. 5, the stub shaft can be secured within the drive sleeve 90 against axial movement away from the rear drive shaft 62 through a nut and washer combination 108. In the illustrated arrangement, the bearing 104 is sandwiched between a step formed on the stub shaft 106 and the end of the drive sleeve 90 for reasons that will become apparent.

The end of the stub shaft 106 comprises a pinion gear 110 and a portion journaled relative to the main case 76 by a set of needle bearings 111. The pinion gear 110 meshes with a ring gear 112. The meshing of the pinion gear and the ring gear 112 is accompanied by a slight amount of backlash. Adjusting the degree of backlash in the system can be accomplished by adjusting the mating positions of the pinion gear 110 and the ring gear 112, thus achieving proper meshing and improved performance.

The illustrated construction fixes the position of the pinion gear 110 relative to the first cover 78. Thus, by placing one or more appropriately sized shims 114 between the main case 76 and the first cover 78, the position of the pinion gear 110 relative to the ring gear 112 can be more easily controlled. During assembly, the placement of the pinion gear 110 relative to the ring gear 112 can be incrementally adjusted by altering the shim size or the number of shims used. Thus, the pinion gear 110 can be moved axially away from the circumference of the ring gear 112 by inserting more shims or by inserting larger shims and the pinion gear 110 can be moved axially toward the circumference of the ring gear 112 by removing shims or by inserting smaller shims.

Furthermore, in the illustrated construction, at least the following components can be moved relative to the ring gear 112 as a single unit: the pinion gear 110, the stub shaft 106, the bearing 104, the drive sleeve 90, the first cover 78 and the brake components. Thus, the housing 70 can be thought of as having two portions that are adjustable relative to each other in an axial direction of the drive shaft. These two portions respectively comprise the pinion gear 110 and the ring gear 112.

The illustrated ring gear 112 is journaled relative to the second cover 82 with a bearing, such as the ball bearing 115. The ring gear 112 also is mounted to a coupling member 116. The coupling member joins the ring gear 112 and the two axle sleeves 80. The coupling member 116 is suitably journaled relative to the main case 76 with a set of bearings, preferably needle bearings 118. The two axle sleeves 80 preferably are fixed for rotation with the coupling member 116. In the illustrated arrangement, the three components are fixed with the use of splines. Keyways or the like also can be used to secure the three components for rotation. Moreover, suitable seals 120 are used to seal gaps between the rotating sleeves 80 and the stationary second lid 82 and the stationary main case 76, respectively.

In one arrangement, the CV joints and the ring gear, can be constructed similar to the manner disclosed in U.S. Pat. No. 6,250,415, issued on Jun. 26, 2001 and hereby incorporated by reference in its entirety. Such a construction can decrease the lateral dimension of the coupling between the half shafts and the drive shafts while increasing the length of the half shafts to provide more suspension travel.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A drive system for a small vehicle, the system comprising an engine crankshaft, a drive shaft driven by said crankshaft, said drive shaft extending in a generally longitudinal direction, a gear housing being disposed proximate a distal end of said drive shaft, said gear housing comprising an opening that is substantially closed by a first cover, said drive shaft being coupled to a drive sleeve, said drive sleeve extending through an aperture defined in said first cover, a stub shaft being rotationally secured to said drive sleeve and coupling a pinion gear to said drive sleeve, a substantially exposed brake disc being secured to said drive sleeve and a caliper being secured to said first cover, said caliper being capable of clamping said brake disc, said brake disc and said caliper being secured against movement along an axis of said drive sleeve, said pinion gear being disposed within said gear housing and meshing with a ring gear, said pinion gear being axially fixed relative to said first cover and axially adjustable relative to said ring gear.

2. The system of claim 1, wherein said pinion gear, said stub shaft, said drive sleeve, said caliper, said brake disc and said first cover form a first component and said housing and said ring gear form a second component with said first component being adjustable relative to said second component.

3. The system of claim 2, further comprising a shim that is disposed between said first component and said second component.

4. The system of claim 1, wherein said stub shaft is journaled by a bearing mounted to said first cover.

5. The system of claim 1, wherein a collar is disposed between said drive shaft and said drive sleeve.

6. A drive system for a small vehicle, the drive system comprising a longitudinally extending drive shaft, a pinion gear driven by said drive shaft, said pinion gear meshing with a ring gear, said pinion gear and said ring gear being disposed within a chamber defined by a gear housing, said gear housing comprising a first cover, a brake caliper being affixed to said first cover and being secured against substantial movement along a direction defined by an axis of said pinion gear, said brake caliper being capable of clamping a substantially exposed brake disc, said brake disc also being secured against movement along said direction defined by said axis of said pinion gear, said pinion gear being connected to said first cover, said pinion gear being journaled by a bearing mounted to said first cover and said pinion gear and first cover being axially adjustable relative to said ring gear.

7. The system of claim 6, wherein said brake disc is rotationally coupled to said drive shaft.

8. The system of claim 7, wherein said brake caliper is adapted to operate on said brake disc to effect slowing or stopping of said drive system.

9. The system of claim 6, further comprising an intermediate member that couples said drive shaft to said pinion gear.

10. The system of claim 9, wherein said intermediate member comprises a sleeve member and said brake disc is secured to said sleeve member.

11. The system of claim 9, wherein said pinion gear is axially adjustable relative to said drive shaft.

* * * * *